Patented June 20, 1933

1,914,478

UNITED STATES PATENT OFFICE

MICHELE BONOTTO, OF TURIN, ITALY, ASSIGNOR, BY MESNE ASSIGNMENTS, TO AMERICAN SOYA PRODUCTS CORPORATION, OF EVANSVILLE, INDIANA, A CORPORATION OF INDIANA

BREAD-LEAVENING COMPOSITION

No Drawing.   Application filed December 15, 1930. Serial No. 502,625.

This invention relates to improvements in bread-leavening composition and particularly to a composition for use in association with yeast in making leavened white bread. It comprises an improvement upon the invention described and claimed in my application, Serial No. 488,702, filed October 14, 1930, in which I described a composition produced from a vegetable sodium proteinate derived from refined soya bean curd mixed with bicarbonate of soda and also disclosed a composition embodying said vegetable sodium proteinate in combination with mineral salts, such as sodium biphosphate, calcium lactate and calcium biphosphate.

In conventional modern making of bread, the yeast is activated and the quality of the bread is improved by the use of a certain quantity of protein usually in the form of cow milk or a powder of cow milk, and to this protein is added some mixture of mineral salts such as salts of calcium, phosphates, salts of ammonia, sodium, potassium, etc., and one of the objects of this invention is to provide a composition in which the aforesaid mineral salts are replaced by vegetable proteinates of calcium and sodium biphosphate and similar compounds and also, when desired, a vegetable proteinate of ammonium may be employed, and I am thus enabled to produce improved compositions embodying vegetable sodium proteinate as the primary yeast-activating protein ingredient combined with calcium proteinate as an auxiliary yeast-activating element which will add the valuable calcium element in an improved form, viz., a vegetable form, which is more desirable for human consumption than the mineral form heretofore used; also to combine with said primary ingredient sodium phospho-proteinate as an auxiliary yeast-activating element which will also add to the bread produced the valuable phosphate elements in a better form, and I am also enabled to combine in a vegetable form another auxiliary yeast-activating element, viz., ammonium proteinate which will act to further raise the bread and to greatly increase the porosity thereof, and these ingredients, when used in association with yeast in making a dough batch, will not only improve the symmetry, bloom, color of crust, consistency of crust, volume, color of the crumb, grain of texture, keeping quality and also increase the yield in loaves, but will enable the baker, by a variation of the ingredients employed or by a variation in the proportions of the ingredients, to produce loaves having varying qualities.

In the preferred form of my invention, I produce such vegetable proteinates of calcium, sodium biphosphate and ammonium from a moist soya bean curd of the character hereinafter described. Thus I produce a proteinate of calcium by the mixing with such curd of calcium hydroxide. I produce a phospho-proteinate of sodium by mixing with such curd sodium biphosphate and I produce a proteinate of ammonia by mixing with such curd ammonium hydroxide. I am thus enabled to mix one or more of these three vegetable auxiliary proteinates with the primary vegetable sodium proteinate in suitable proportions to obtain varying results in the factors hereinabove specified of the bread produced and I am particularly enabled to increase the water-content and the yield in loaves that may be procured over the use of cow milk or the ordinary cow milk powder.

In carrying out my process, I may utilize vegetable protein curd derived from any suitable source but, in the preferred form of my invention, the auxiliary vegetable proteinates are derived by mixing moist soya bean curd with calcium hydroxide, sodium biphosphate or ammonium hydroxide as the case may be, and kneading or agitating the mixture until the soya bean protein is dissolved. Such vegetable proteinates are less expensive than proteinates derived from other sources and will also be more desirable as ingredients in the food product.

Soya bean curd made in the conventional way has a characteristic unpleasant taste and will transmit a dark color to the bread, and this form of soya-bean curd may, therefore, be used only in cases where this color and taste are not considered important. When, however, it is desired to utilize my bread-leavening composition for white wheat bread it is necessary, in order to prevent transmission to such white bread of the usual unpleasant taste and odor and also to prevent discoloration of the bread, to utilize a curd which has been so purified as to free it not only from the said characteristic unpleasant taste and odor of the conventional soya bean but also to provide a curd which has been so purified as to free the same from the chlorophyl elements which would otherwise cause discoloration of bread, and, therefore, in the preferred form of my invention, I utilize a curd made in accordance with the process described in my application, Serial No. 437,265, filed March 19, 1930, for "refined vegetable product and process of making same." In accordance with said process, soya beans in the whole or dried bean or in such pieces as will avoid rupturing the oil cells thereof, are subjected to a bath containing a water soluble bleaching agent preferably comprising sulphur dioxide and water ($SO_2$ plus $H_2O$) at such relatively low temperatures as will not substantially change or alter the natural proteins or oil or fat contents thereof. Such beans are preferably immersed in a very weak and unstable solution of said sulphur dioxide and water having a quantity of sulphur dioxide in excess of the amount necessary to bleach and purify the beans. The charge of beans is maintained in this solution for a period of time which I find to be about ten hours and until they are completely saturated therewith and swelled or expanded thereby. The sulphur dioxide is then preferably liberated from the beans in gaseous form and this is preferably accomplished without the use of a neutralizing agent which would leave in the beany substance a reaction product or residue. While the liberation of the sulphur dioxide may be accomplished by subjecting the expanded charge of beans to washing with pure water, if such washing is continued for a sufficiently long period of time, I preferably accomplish this purpose by applying a suitable quantity of heat to the charge of beans in order to facilitate and accelerate the liberation of sulphur dioxide. This heat is preferably applied in a plurality of operations and, in the preferred process, I subject the charge of beans for a period of twenty to thirty minutes to a temperature from 60° C. to 80° C., and thereafter subject said beans to a temperature of one hundred degrees (100° C.) for a period of from one to four minutes.

Another method of removing the sulphur dioxide is, after draining off the solution of sulphur dioxide, to circulate through the beans in any suitable manner pure water and thereafter to subject the beans to the action of the steam at 100° C., for a period of from one to four minutes.

By the use of said process of application, Serial No. 437,265, I produce a new refined leguminous soya bean product which will have a white color, because chlorophyl pigment has been bleached; which will have the pleasant and agreeable taste or flavor of the bleached and taste-purified beany substance free from the characteristic unpleasant raw bean taste or flavor and free from any foreign salts or other foreign substances introduced during the process as a reaction product of a neutralizing agent with the bleaching agent; which will have the proteins in the natural condition unaltered by the process of bleaching and taste-purifying and soluble in water; which will have the proteins and fatty substances in their natural combined form unaltered by the process of bleaching and taste-purifying.

The oil may now be removed in any well-known manner, as by pressing the soya bean product or by the use of a solvent, such as benzine, and a dry soya bean flour is produced which will have the bread-leavening properties hereinabove specified and may be used in this form in association with yeast and as a substitute for cow's milk to produce a bread of good quality and nutritive value but such bread will still have a slightly yellowish shade of color, as hereinafter stated.

In the preferred form of my invention, however, I make from soya bean flour a moist soya bean curd by any well-known process. By the use of the process of my former application, Serial No. 437,265 hereinabove specified, I am enabled to obtain a soya bean flour from which a purified soya bean curd may be made. A curd so derived is not only capable of being mixed with and dissolved by calcium hydroxide, sodium biphosphate and amonium hydroxide to form a vegetable proteinate having the desired bread-leavening properties but will produce a vegetable proteinate which will also be free from any unpleasant odor or taste which would be transmitted to the bread and which will not, in the baking operation, cause any discoloration of white bread. These vegetable proteinates may be used in dough batches in association with yeast and the vegetable-sodium-proteinate substitute for cow's milk and will, when so used in association with yeast and vegetable sodium proteinate, provide substitutes for the mineral salts heretofore conventionally employed in association with cow's milk. These mineral-salt substitutes may also, if desired, be used in combination with cow milk or cow-milk powder.

Instead of the sodium salts specified, I can, if desired, use salts of potassium or a combination of both sodium and potassium.

In the preferred embodiment of my invention, however, the auxiliary vegetable proteinates hereinabove specified are dried, powdered and mixed with said main or fundamental vegetable sodium or potassium proteinate. I find that when a powder so composed is employed in bread-making with a suitable quantity of water, the bread-leavening properties of the yeast will be materially improved and in conventional dough batches, the addition of such composition, will cause the bread to be improved as aforesaid and the leavening properties to be increased to a greater extent and the yield in loaves obtained to be greater than when vegetable sodium or potassium proteinate is employed alone.

I find that by the use of auxiliary vegetable sodium or potassium phosphoproteinates and the vegetable proteinates of calcium, and ammonium in combination with the main or fundamental vegetable sodium or potassium proteinate as above specified, and in the form specified, the baker will be enabled to produce varying results and particularly will be enabled to increase the quantity of water which will be retained in the finished product. I find also that by the addition to a conventional dough-batch of two to two and one-half percent (2½%) of a compound embodying the main vegetable sodium or potassium proteinate combined with calcium proteinate and sodium or potassium phosphoproteinate, I am enabled to increase by material percentages over the use of cow milk the following factors in bread: Symmetry; bloom; color of crust; volume; consistency of crust; color of crumb; grain of texture; keeping quality; and yield in loaves; and by the addition of ammonium proteinate, I am enabled to procure a bread of a different texture having much greater porosity and still greater volume than is possible by the use of the three proteinates hereinabove mentioned.

It will be understood that the main and auxiliary vegetable proteinates hereinabove specified may be used in such varied proportions relatively to each other as to produce the characteristics and residual ingredients in the bread desired. An example of such proportions is one-half of main sodium or potassium proteinate and one-sixth of each of the three auxiliary proteinates.

Having described my invention, I claim:—

1. The herein-described composition for use with yeast in making leavened bread comprising a main vegetable proteinate, and auxiliary proteinates comprising calcium proteinate and sodium or potassium phosphoproteinate.

2. The herein-described composition for use with yeast in making leavened bread comprising a main vegetable proteinate, and auxiliary proteinates comprising a vegetable calcium proteinate and a vegetable sodium or potassium phosphoproteinate.

3. The herein-described composition for use with yeast in making leavened bread comprising a main vegetable sodium or potassium proteinate, and auxiliary proteinates comprising a vegetable calcium proteinate, a vegetable sodium or potassium phosphoproteinate and a vegetable ammonium proteinate.

4. A dough batch for use with yeast in making leavened bread embodying with other standard ingredients, a main protein ingredient and an auxiliary yeast-activating ingredient comprising a substitute for the conventional mineral salts and composed of a vegetable calcium proteinate and a vegetable sodium or potassium phosphoproteinate.

In witness whereof, I have signed my name to the foregoing specification.

MICHELE BONOTTO.